United States Patent
Ariga et al.

(10) Patent No.: US 7,635,078 B2
(45) Date of Patent: Dec. 22, 2009

(54) BRAZING METHOD UTILIZING METALLIC POROUS MATERIALS

(75) Inventors: Tadashi Ariga, Oiso-machi (JP); Kiichi Kanda, Hiratsuka (JP)

(73) Assignee: Kanto Yakin Kogyo Kabushiki Kaisha, Kanagawa-ken (JP)

( * ) Notice: Subject to any disclaimer, the term of this patent is extended or adjusted under 35 U.S.C. 154(b) by 0 days.

(21) Appl. No.: 11/347,385

(22) Filed: Feb. 6, 2006

(65) Prior Publication Data

US 2006/0180640 A1    Aug. 17, 2006

(30) Foreign Application Priority Data

Feb. 17, 2005    (JP)    ............................... 2005-040825

(51) Int. Cl.
| | |
|---|---|
| B23K 20/00 | (2006.01) |
| B23K 28/00 | (2006.01) |
| B23K 1/20 | (2006.01) |
| B23K 5/213 | (2006.01) |
| B23K 20/24 | (2006.01) |
| B23K 35/12 | (2006.01) |
| B22F 1/00 | (2006.01) |
| C22C 1/04 | (2006.01) |

(52) U.S. Cl. ........................ 228/194; 228/193; 228/203; 228/204; 228/245; 419/31; 419/44; 419/45

(58) Field of Classification Search .................. 228/193, 228/194, 119, 175, 203, 204, 245; 419/30, 419/31, 38, 44, 45

See application file for complete search history.

(56) References Cited

U.S. PATENT DOCUMENTS

| | | | | |
|---|---|---|---|---|
| 4,608,225 | A | * | 8/1986 | Sakuramoto et al. ............ 419/5 |
| 5,156,321 | A | * | 10/1992 | Liburdi et al. ................ 228/119 |
| 7,115,679 | B2 | * | 10/2006 | Ellison et al. ................ 524/439 |
| 2002/0104405 | A1 | * | 8/2002 | Haack et al. ................... 75/249 |
| 2005/0115942 | A1 | * | 6/2005 | Stevenson et al. ....... 219/137 R |

FOREIGN PATENT DOCUMENTS

| | | |
|---|---|---|
| JP | 5-339605 | 12/1993 |
| JP | 6-158116 | 6/1994 |
| JP | 2003-328006 | 11/2003 |
| JP | 2003-328007 | 11/2003 |

* cited by examiner

Primary Examiner—Karl E Group
Assistant Examiner—Noah S Wiese
(74) Attorney, Agent, or Firm—Shlesinger, Arkwright & Garvey LLP

(57) ABSTRACT

This invention relates to a method of brazing while the thickness of the opening between materials being brazed can not be maintained constant or can not be adjusted in the appropriate range. In order to solve this issue the porous material of metals or metal alloys consisting of Ni, Cu, Ti, Al, Ag or W should be utilized. The metallic porous material is inserted into the brazing opening mentioned above by using the softness of it, and is made to hold the brazing solder and to reinforce the bonding part after brazing.

2 Claims, 2 Drawing Sheets

US 7,635,078 B2

BRAZING METHOD UTILIZING METALLIC POROUS MATERIALS

CROSS-REFERENCE TO RELATED APPLICATION

This application claims priority of Japanese Application No. 2005-40825, filed Feb. 17, 2005, which is incorporated herein by reference.

FIELD OF THE INVENTION

This invention relates to a method of brazing while the thickness of the opening between materials being brazed cannot be maintained constant or can not be adjusted in the appropriate range. In order to solve this issue the porous material of metals or metal alloys consisting of Ni, Cu, Ti, Al, Ag or W should be utilized. The metallic porous material mentioned above is inserted into the brazing opening mentioned above. The metallic porous material is inserted into the brazing opening mentioned above by using the softness of the metallic porous material and is made to hold the brazing solder and to reinforce the bonding part after brazing.

BACKGROUND OF THE INVENTION

Soft porous materials of metals or metal alloys are well known, however, the area of utilization of these materials is limited and utilization in the area of brazing is not developed at all.

Manufacturing methods of porous materials of metals or metal alloys are mentioned in Japanese Patent Laying Open Publication Number Heisei 5-339605, Japanese Patent Laying Open Publication Number Heisei 6-158116, Japanese Patent Laying Open Publication Number 2003-328006, and Japanese Patent Laying Open Publication Number 2003-328007 etc. Most of these porous materials have softness. Softness here means that the material is fiber type like cotton and that the thickness of the material is freely adjusted by pressure.

However utilization of these porous materials is not known in the area of brazing.

In brazing sometimes the opening thickness between the materials being brazed, which might be metals, metal alloys, ceramics etc., can not be kept constant. In other words, the opening might be rather large, or the shape of the materials being brazed might not be ordinary, or the number of parts to be brazed is more than two or larger. In these cases it is very difficult to keep bonding opening constant even if using holding tools, and consequently it is impossible to have good brazing. Also it is impossible to have good brazing when the opening thickness between the materials being brazed is rather larger than the proper opening thickness 0-0.05 mm indicated in Brazing Handbook (AWS) 1991, for example, the opening thickness is more than 0.1 mm.

It is important to have the proper bonding opening because the liquid solder is inserted into the bonding opening and then bonding is done by curing the melted solder. This is the basis of brazing. When the bonding opening is bigger as mentioned above, liquid solder can not be inserted and held in between.

OBJECTS AND SUMMARY OF THE INVENTION

It is an object of the invention to overcome the drawbacks of the prior art.

In this invention, the brazing opening is adjusted by using the softness of the porous materials of metals or metal alloys when the normal brazing has difficulty (Refer to FIG. 1 and FIG. 2), or putting the solder together with the porous material so that it can hold the solder. In other words the porous material is inserted into the opening between the materials being brazed, the solder is added to the upper and lower surfaces of the porous material and heated.

The solder is melted by heat and penetrates into the pores of the porous material, then porous material and solder are together and bonded to the main component of the material being brazed, which is metals or metal alloys consisting of Fe, Cu, Al, Ti, Ni etc. or ceramics. Solder can be added to the porous material beforehand.

This invention includes a method of utilizing the porous material of metals or metal alloys as inserting the porous material into the bonding opening which is not maintained constant or properly by utilizing the softness of the porous material. Inserted porous material holds solder.

Metals or metal alloys consisting of Ni, Cu, Ti, Al, Ag or W can be used as the porous material mentioned above.

This invention does not propose only the technology of adjusting the openings mentioned above. In the case, for example, using solder whose melting point is lower than nickel, such as silver solder, nickel solder, aluminum solder or copper solder, and if nickel is included in the porous material, nickel in the porous material remains in the bonding section after brazing. And it is effective to the strength of the bonding section and it eases the stress of various kinds. In this case the important point is that nickel fiber in the porous material and solder have metallic interface.

DETAILED DESCRIPTION OF THE INVENTION

Explanation of Reference Numbers

1—Metallic porous material
2—Solder such as silver solder
3—Material to be brazed

Examples

Example 1

Nickel powder was penetrated into urethane and sintered at 1,300° C., then the soft metallic porous material (Nickel mat) 1 was obtained. This porous material 1 can be sintered after silver solder 2 (700-950° C.) is penetrated. The thickness of this metallic porous material was 1.5 mm. Material to be brazed 3, SUS 304 stainless steel plates were used in this example. The term "SUS 304" refers to austenite stainless steel in accordance with the JIS (Japanese Industrial Standard) having Cr of 18% and Ni of 8%.

Figure 1:
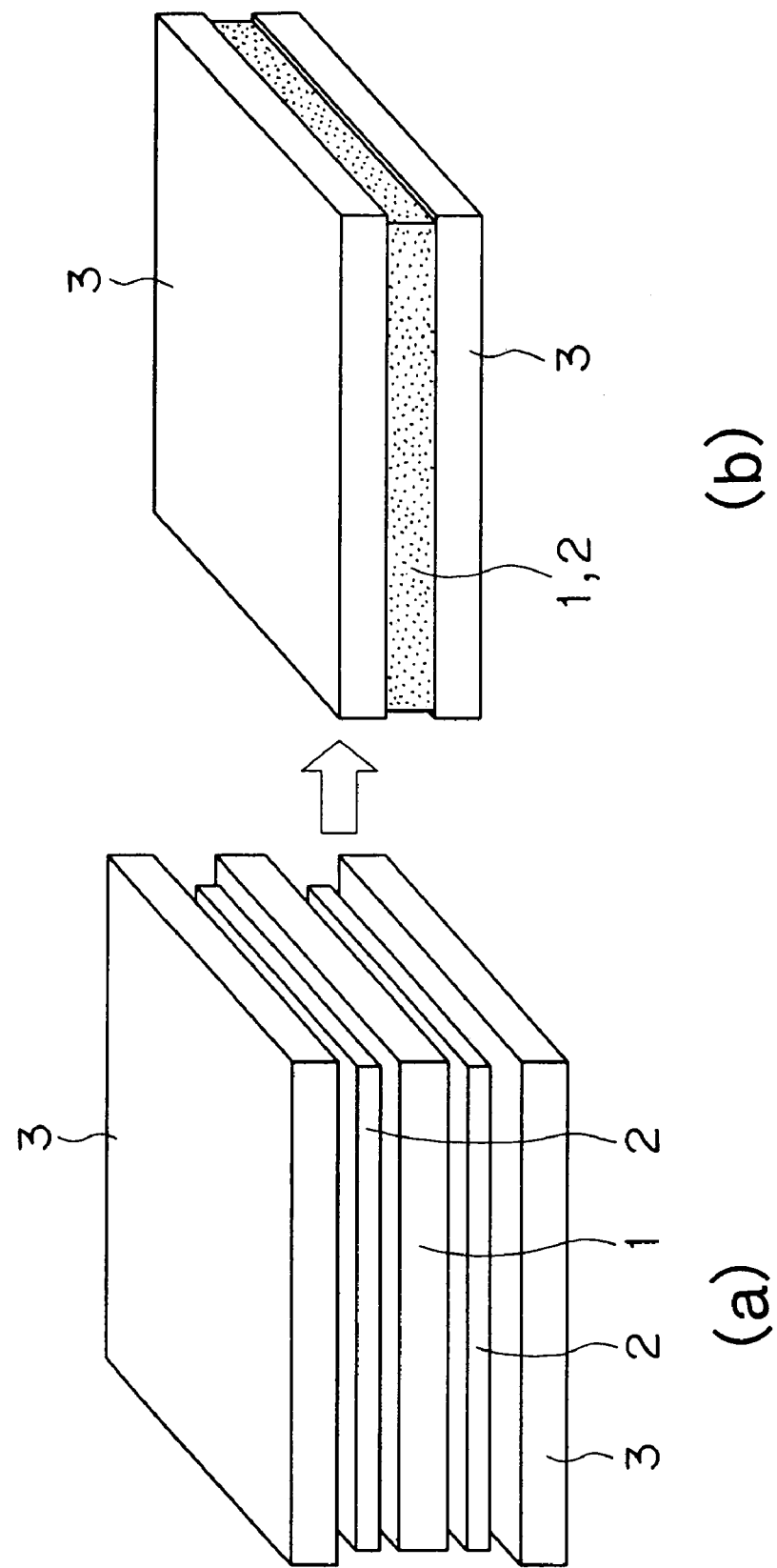
FIG. 1 explains how to realize this invention in case the porous material is nickel, it is held by solder and materials to be brazed are flat plates (EXAMPLE 1)

As shown in the figure before brazing ((a) in FIG. 1) in FIG. 1 porous material 1 was processed by pressure and thickness of this material became 0.4 mm from the original thickness 1.5 mm. This 0.4 mm is larger than normal appropriate thickness. The porous material 1 can be processed easily to the desired thickness.

The porous material 1 of 0.4 mm was placed between two stainless plates 3, the porous material 1 was sandwiched by silver solder 2 and heated in furnace at 1,000° C. for 10 minutes. After this processing sample was cut and neighborhood of brazing interfaces were studied by microscope. It was confirmed the solder was evenly distributed in the bonding opening of 0.4 mm and nickel of banded tissue was well spread in the solder and nickel and solder were bonded metallically. ((b) in FIG. 1)

Generally it is impossible to pack the opening thickness of 0.4 mm by solder. As mentioned before proper opening thickness is 0-0.05 mm as indicated in Brazing Handbook (AWS) 1991.

Example 2

Figure 2:
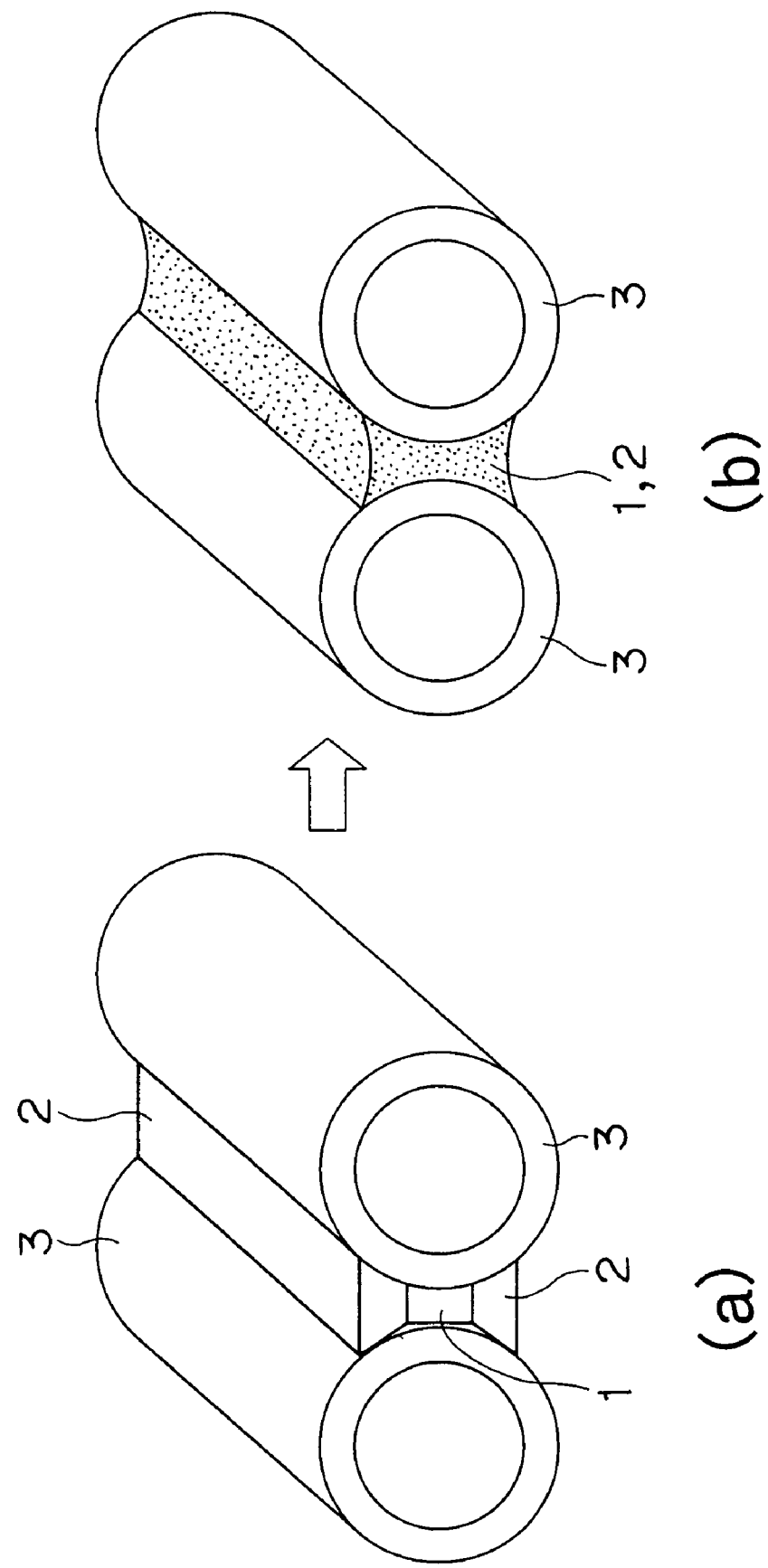
FIG. 2 explains how to realize this invention in case the porous material is nickel, it is held by solder and materials to be brazed are tube types (EXAMPLE 2).

As shown in FIG. 2 two tube type stainless steels (SUS 304) 3 and 3 were brazed using the same materials in EXAMPLE 1. ((a) in FIG. 2). The term "SUS 304" refers to austenite stainless steel in accordance with the JIS (Japanese Industrial Standard) having Cr of 18% and Ni of 8%.

As a result two tubes 3 and 3 were strongly brazed by metallic bonding between nickel and solder same as EXAMPLE 1. ((b) in FIG. 2).

Although the porous material 1 was manufactured by nickel in the examples above, it is obvious that other metals or metal alloys consisting of Cu, Ti, Al, Ag or W can be used as the porous material.

Although silver solder was used as the solder 2 in the examples above, other solders can be used. For example nickel solder (950-1,250° C.), aluminum solder (580-610° C.), Sn—Ag solder (300-500° C.), gold solder (1,000-1,300° C.) etc. can be used.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

What is claimed is:

1. A brazing method comprising:
    a) making a porous material consisting of metals or metal alloys, the metals or metal alloys comprising Ni, Cu, Ti, Al, Ag, or W, and being a soft metallic porous material, and the soft metallic porous material being made by sintering its metals or metallic alloy powders penetrated into a urethane;
    b) utilizing the soft metallic porous material made beforehand in the step of making a porous material in a brazing process, and utilizing the soft metallic porous material when the thickness of an opening for brazing between materials cannot be maintained constant or cannot be adjusted in a thickness range of less than 0.05 mm, and in which brazing process the metallic porous material made beforehand is inserted into the opening between the materials being brazed and reinforced by using the softness of the soft metallic porous material; and
    c) in the step of utilizing the soft metallic porous material in a brazing process, the metallic porous material, together with a solder held or added beforehand to the soft metallic porous material, is inserted under pressure into the opening between the materials being brazed by using the softness of the soft metallic porous material.

2. A brazing method as in claim 1, wherein:
    a) after brazing, metallic porous material is well spread in the solder, and it is effective to the strength of the bonding section and it eases stress of various kinds.

\* \* \* \* \*